United States Patent
Lin

(10) Patent No.: US 10,484,546 B1
(45) Date of Patent: Nov. 19, 2019

(54) DOORBELL CONVERSION DEVICE AND DOORBELL ASSEMBLY

(71) Applicant: Chicony Electronics Co., Ltd., New Taipei (TW)

(72) Inventor: Wen-Chang Lin, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 0 days.

(21) Appl. No.: 16/229,861

(22) Filed: Dec. 21, 2018

(30) Foreign Application Priority Data

Jul. 13, 2018 (TW) .............................. 107124398 A

(51) Int. Cl.
| H04M 11/02 | (2006.01) |
| G06F 1/26 | (2006.01) |
| G10K 1/063 | (2006.01) |

(52) U.S. Cl.
CPC .............. *H04M 11/02* (2013.01); *G06F 1/26* (2013.01); *G10K 1/063* (2013.01)

(58) Field of Classification Search
CPC ... H04M 1/0291; H04M 11/025; H04N 7/186
USPC .................................................. 379/167.05
See application file for complete search history.

(56) References Cited

U.S. PATENT DOCUMENTS

| 5,666,428 A * | 9/1997 | Farinelli ............... H04M 1/723 379/102.02 |
| 8,189,753 B1 * | 5/2012 | Soucy, III ............ H04M 11/025 379/159 |
| 2018/0343142 A1 * | 11/2018 | Scalisi ................ H04L 12/2823 |

* cited by examiner

*Primary Examiner* — Maria El-Zoobi
(74) *Attorney, Agent, or Firm* — Muncy, Geissler, Olds & Lowe, P.C.

(57) ABSTRACT

A doorbell conversion device includes a power input terminal, a power output terminal, two doorbell trigger terminals, a power conversion unit, and a trigger signal unit. The power conversion unit is coupled between the power input terminal and the power output terminal for generating a sensing signal in response to an electric potential of the power output terminal. While the electric potential of the power output terminal is grounded, the power input terminal and the power output terminal are disconnected. In contrast, the power input terminal and the power output terminal are connected. The trigger signal unit is coupled between the power conversion unit and the two doorbell trigger terminals for controlling the two doorbell trigger terminals to be opened or shorted based upon the sensing signal. While the electric potential of the power output terminal is grounded, the two doorbell trigger terminals are shorted. In contrast, they are opened.

10 Claims, 2 Drawing Sheets

DOORBELL CONVERSION DEVICE AND DOORBELL ASSEMBLY

CROSS-REFERENCE TO RELATED APPLICATION

This non-provisional application claims priority under 35 U.S.C. § 119(a) to Patent Application No. 107124398 filed in Taiwan, R.O.C. on Jul. 13, 2018, the entire contents of which are hereby incorporated by reference.

BACKGROUND

Technical Field

The instant disclosure relates to a doorbell field and, more particularly, to a doorbell conversion device and a doorbell assembly.

Related Art

In general, every house nowadays has a doorbell device for a guest to notify people in the house to open a door. The doorbell device is mainly consisted of a doorbell for making a sound and a doorbell switch for driving the doorbell to make the sound. Wire doorbells, wireless doorbells, and smart doorbells are major types in the field. The conventional wire doorbells can be further divided into mechanical doorbells and electric doorbells.

The mechanical doorbell is mainly powered by an alternating current power source. The doorbell switch is functioned as a power switch. While the power is turned on, and sufficient current passes through, a magnetic reed is attracted for knocking and sounding. The mechanical doorbell mainly transmits power.

The electric doorbell is mainly powered by a direct current power source. The doorbell switch is only for providing a trigger signal and is not functioned as a power switch. While the trigger signal is provided, a doorbell chip is triggered to drive a speaker or a buzzer for making a sound. The electric doorbell mainly transmits signals.

The wireless doorbell is mainly powered by a battery or a power source. A main difference between the wireless doorbell and the electric doorbell is that a doorbell and a doorbell switch of the wireless doorbell are not mechanically connected and are wirelessly communicated with signals. Thus both of the doorbell and the doorbell switch of the wireless doorbell are independently connected to the power source or powered by batteries. The wireless doorbell mainly transmits wireless signals.

The smart doorbell provides functions that the wire doorbell and the wireless doorbell have. In addition, the smart doorbell could be connected to a network and may have filming function. The smart doorbell could be connected to mobile devices, which allows users to be notified, to operate, to monitor, and to record videos in a remote manner.

The electric doorbells among the aforementioned types of the doorbell devices are generally used in most of houses. The smart doorbells are not widely used. Internet of Things is a trend in household appliances in the future. Thus, it is expected that the conventional doorbells will be replaced by the smart doorbells. However, the electric doorbells are durable. It is a waste to users and is not environmentally friendly if old but well-functioning electric doorbells are replaced by new smart doorbells; therefore, people have less motivation to replace their doorbells. In addition, improvements of Internet of Things are rapid, and functions of smart doorbells are keep upgrading. Product positioning and function of smart doorbells are not clear. Thus a part of consumers still has concerns about smart doorbells. However, commercially available electric doorbells are incapable of being in connection with Internet of Things. Consumers purchasing these electric doorbells still need to face the aforementioned issues in the future.

SUMMARY

To address the above issue, the instant disclosure provides a doorbell conversion device and a doorbell assembly.

In an embodiment, a doorbell conversion device comprises a power input terminal, a power output terminal, two doorbell trigger terminals, a power conversion unit, and a trigger signal unit. The power input terminal is for receiving an input power. The power conversion unit is coupled between the power input terminal and the power output terminal for generating a sensing signal in response to an electric potential of the power output terminal. While the electric potential of the power output terminal is grounded, the power input terminal and the power output terminal are disconnected. While the electric potential of the power output terminal is not grounded, the power input terminal and the power output terminal are connected to have the power output terminal output an output power based upon the input power. The trigger signal unit is coupled between the power conversion unit and the two doorbell trigger terminals for controlling the two doorbell trigger terminals to be opened or shorted based upon the sensing signal. While the electric potential of the power output terminal is grounded, the two doorbell trigger terminals are shorted. While the electric potential of the power output terminal is not grounded, the two doorbell trigger terminals are opened.

In some embodiments, the power conversion unit comprises a voltage dividing circuit and a first switch. The voltage dividing circuit is coupled to the power output terminal for generating a control signal based upon a dividing of the electric potential of the power output terminal. The first switch is coupled between the power input terminal and the power output terminal. The first switch comprises a control electrode. The control electrode is coupled to the voltage dividing circuit for having the first switch connected or disconnected based upon the control signal.

In some embodiments, the power conversion unit further comprises a second switch comprising a first terminal, a second terminal, and a control terminal. The control terminal is coupled to the voltage dividing circuit. The first terminal is coupled to the control electrode of the first switch. The second terminal is grounded. Wherein the first switch is a P-type transistor, and while the electric potential of the power output terminal is not grounded, the second switch is connected to have the control electrode of the first switch grounded and the first switch connected.

In some embodiments, the power conversion unit further comprises a bypass circuit coupled to two terminals of the first switch for transmitting the sensing signal. The trigger signal unit comprises an isolation coupling component. The isolation coupling component comprises a primary side and a secondary side. The primary side receives the sensing signal. The secondary side is coupled to the two doorbell trigger terminals.

In some embodiments, the isolation coupling component is an optical coupler.

In an embodiment, a doorbell assembly comprises a power input terminal, a power output terminal, two doorbell trigger terminals, a power conversion unit, a trigger signal unit, and a doorbell unit. The power input terminal is for receiving an input power. The power conversion unit is coupled between the power input terminal and the power output terminal for generating a sensing signal in response to an electric potential of the power output terminal. While the electric potential of the power output terminal is grounded, the power input terminal and the power output terminal are disconnected. While the electric potential of the power output terminal is not grounded, the power input terminal and the power output terminal are connected to have the power output terminal output an output power based upon the input power. The trigger signal unit is coupled between the power conversion unit and the two doorbell trigger terminals for controlling the two doorbell trigger terminals to be opened or shorted based upon the sensing signal. While the electric potential of the power output terminal is grounded, the two doorbell trigger terminals are shorted. While the electric potential of the power output terminal is not grounded, the two doorbell trigger terminals are opened. The doorbell unit is coupled between the power input terminal and the two doorbell trigger terminals for outputting a doorbell sound while the two doorbell trigger terminals are shorted, and not outputting the doorbell sound while the two doorbell trigger terminals are opened.

Concisely, according to embodiments of the doorbell conversion device of the instant disclosure, the doorbell trigger terminals being shorted or opened can be controlled by the electric potential of the power output terminal. Further, a triggering signal of a doorbell switch of a smart doorbell can be converted into a triggering signal of a doorbell sound of an electric doorbell, and an input power of the electric doorbell can be converted into an operating power of the smart doorbell in a normal state. In addition, according to embodiments of the doorbell assembly of the instant disclosure, the doorbell conversion device and the doorbell unit can be integrated. Further, a triggering signal of a doorbell switch of a smart doorbell can be converted into a doorbell sound of the doorbell assembly, and an input power of the doorbell assembly can be converted into the operating power of the smart doorbell in the normal state. As a result, the electric doorbell and the smart doorbell can be effectively linked without the need of additional power and can provide additional effect.

DETAILED DESCRIPTION

Figure 1:
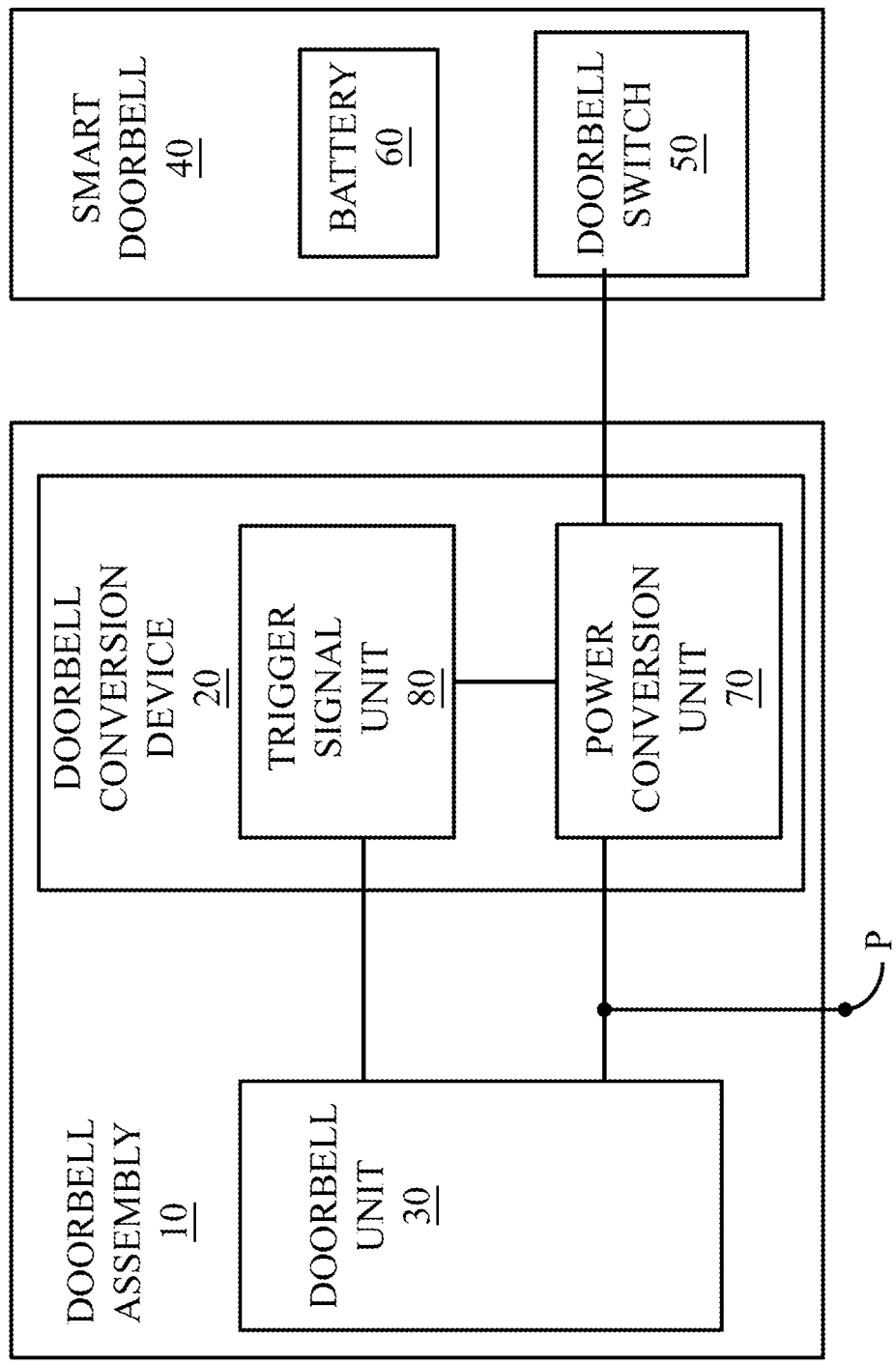
FIG. 1 illustrates a block diagram of a doorbell assembly according to an embodiment of the instant disclosure.

FIG. 1 is a block diagram of a doorbell assembly 10 according to an embodiment of the instant disclosure. The doorbell assembly 10 comprises a doorbell conversion device 20 and a doorbell unit 30. The doorbell conversion device 20 is coupled to the doorbell unit 30. The doorbell assembly 10 is coupled to a smart doorbell 40. The smart doorbell 40 comprises a doorbell switch 50. The doorbell switch 50 is coupled to the doorbell conversion device 20.

Figure 2:
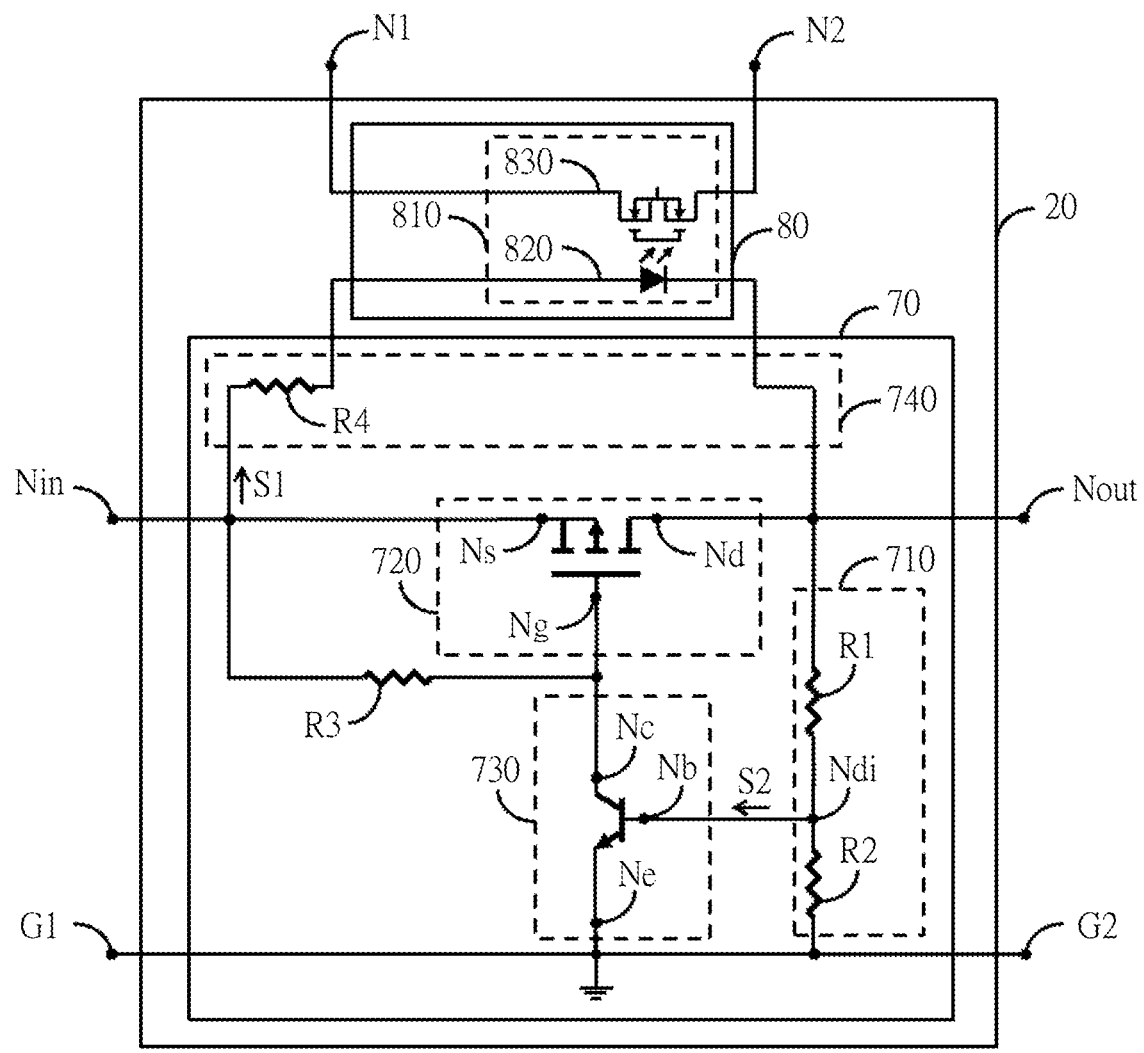
FIG. 2 illustrates a circuit diagram of a doorbell conversion device according to an embodiment of the instant disclosure.

FIG. 2 illustrates a circuit diagram of the doorbell conversion device 20 according to an embodiment of the instant disclosure. The doorbell conversion device 20 comprises a power conversion unit 70, a trigger signal unit 80, a power input terminal Nin, a power output terminal Nout, two doorbell trigger terminals N1, N2, and two grounded terminals G1, G2. The power conversion unit 70 is coupled between the power input terminal Nin, the power output terminal Nout, the two grounded terminals G1, G2, and the trigger signal unit 80. The trigger signal unit 80 is coupled between the power conversion unit 70 and the two doorbell trigger terminals N1, N2.

In some embodiments of the instant disclosure, please refer to FIG. 1 and FIG. 2. The power input terminal Nin receives an input power P. The power conversion unit 70 generates a sensing signal S1 in response to an electric potential of the power output terminal Nout. The sensing signal S1 is for the trigger signal unit 80 to control the two doorbell trigger terminals N1, N2 to be opened or shorted. The smart doorbell 40 is coupled between the power output terminal Nout and the grounded terminal G2. In a normal state, the electric potential of the power output terminal Nout is not grounded. While the doorbell switch 50 of the smart doorbell 40 is triggered, the electric potential of the power output terminal Nout is changed to be grounded. While the electric potential of the power output terminal Nout is grounded (the doorbell switch 50 is triggered), the two doorbell trigger terminals N1, N2 are shorted. In contrast, while the electric potential of the power output terminal Nout is not grounded, the two doorbell trigger terminals N1, N2 are opened. Thus, the doorbell unit 30 determines whether to output a doorbell sound in response to the state (i.e., open or short) between the two doorbell trigger terminals N1, N2. While the two doorbell trigger terminals N1, N2 are shorted, the doorbell unit 30 outputs the doorbell sound. While the two doorbell trigger terminals N1, N2 are opened, the doorbell unit 30 does not output the doorbell sound. As a result, while the doorbell switch 50 of the smart doorbell 40 is triggered, the doorbell unit 30 outputs the doorbell sound. In the normal state, the doorbell unit 30 does not output the doorbell sound.

In some embodiments of the instant disclosure, the trigger signal unit 80 controls the two doorbell trigger terminals N1, N2 to be opened or shorted based upon a determination of whether a voltage value of the sensing signal S1 is greater than a threshold value.

In some embodiments of the instant disclosure, the trigger signal unit 80 controls the two doorbell trigger terminals N1, N2 to be opened or shorted based upon a determination of whether a current value of the sensing signal S1 is greater than a threshold value.

In some embodiments of the instant disclosure, please refer to FIG. 1 and FIG. 2. The smart doorbell 40 further comprises a battery 60. While the electric potential of the power output terminal Nout is grounded (i.e., the doorbell switch 50 is triggered), the power input terminal Nin and the power output terminal Nout are electrically disconnected by the power conversion unit 70. In contrast, in the normal state, the power input terminal Nin and the power output terminal Nout are connected by the power conversion unit 70 to have the power output terminal Nout output an output power based upon the input power P to the smart doorbell 40. As a result, the battery 60 of the smart doorbell 40 will be provided with a charging power, such that while the doorbell switch 50 is triggered, the smart doorbell 40 can still keep working by an operating power supported by the battery 60 even though the power input terminal Nin and the power output terminal Nout are electrically disconnected by the power conversion unit 70.

In some embodiments of the instant disclosure, the doorbell conversion device 20 is coupled to the doorbell unit 30 by the power input terminal Nin and the grounded terminal G1 which are used as contacts. The power input terminal Nin receives the input power P which is provided to the doorbell conversion device 20 and the doorbell unit 30 and is used as the operating power.

In some embodiments of the instant disclosure, please refer to FIG. 2. The power conversion unit 70 comprises a voltage dividing circuit 710 and a first switch 720. The voltage dividing circuit 710 is coupled to the power output terminal Nout. The first switch 720 is coupled between the power input terminal Nin and the power output terminal Nout. The voltage dividing circuit 710 comprises a voltage dividing terminal Ndi for generating a control signal S2 at the voltage dividing terminal Ndi based upon a dividing of the electric potential of the power output terminal Nout. The first switch 720 comprises a control electrode Ng. The control electrode Ng may have the first switch 720 connected or disconnected based upon a variation of the control signal S2.

In some embodiments of the instant disclosure, please refer to FIG. 2. The voltage dividing circuit 710 comprises a first resistance R1 and a second resistance R2. The first resistance R1 is coupled between the power output terminal Nout and the second resistance R2. The second resistance R2 is coupled between the first resistance R1 and a grounded terminal. The voltage dividing terminal Ndi is between the first resistance R1 and the second resistance R2. While the electric potential of the power output terminal Nout is grounded, an electric potential of the control signal S2 is grounded. In contrast, in the normal state, the electric potential of the control signal S2 is a divided electric potential of the first resistance R1 and the second resistance R2.

In some embodiments of the instant disclosure, please refer to FIG. 2. The power conversion unit 70 further comprises a second switch 730. The second switch 730 comprises a first terminal Nc and a control terminal Nb. The first terminal Nc is coupled to the control electrode Ng of the first switch 720. The control terminal Nb is coupled to the voltage dividing terminal Ndi of the voltage dividing circuit 710. The second switch 730 is connected or disconnected based upon the control signal S2, such that the first terminal Nc generates a control electric potential. The first switch 720 is connected or disconnected based upon the control electric potential.

In some embodiments of the instant disclosure, please refer to FIG. 2. The first switch 720 is a P-type transistor. The second switch 730 comprises a second terminal Ne. The second terminal Ne is grounded. In the normal state, while the electric potential of the power output terminal Nout is not grounded, the second switch 730 is connected to have the control electric potential grounded. The first switch 720 is connected based upon the control electric potential being grounded.

In some embodiments of the instant disclosure, please refer to FIG. 2. The power conversion unit 70 further comprises a third resistance R3. The third resistance R3 is coupled between the power input terminal Nin and the control electrode Ng of the first switch 720. In the normal state, the third resistance R3 provides a potential difference between the power input terminal Nin and the control electrode Ng of the first switch 720.

In some embodiments of the instant disclosure, please refer to FIG. 2. The first switch 720 is a P-type transistor and comprises a first electrode Ns, a second electrode Nd, and a control electrode Ng. The second switch 730 is a NPN-type bipolar transistor and comprises a first terminal Nc, a second terminal Ne, and a control terminal Nb. The first electrode Ns of the first switch 720 is coupled to the power input terminal Nin, the second electrode Nd is coupled to the power output terminal Nout, and the control electrode Ng is coupled to the first terminal Nc of the second switch 730. The control terminal Nb of the second switch 730 is coupled to the voltage dividing terminal Ndi of the voltage dividing circuit 710, the first terminal Nc is coupled to the control electrode Ng of the first switch 720, and the second terminal Ne is grounded. The third resistance R3 is coupled between the power input terminal Nin and the control electrode Ng of the first switch 720.

While the electric potential of the power output terminal Nout is grounded, the second switch 730 is disconnected since both of the control terminal Nb and the second terminal Ne of the second switch 730 are grounded. Because a gate electrode of the first switch 720 is of substantial insulation, there is no current substantially passing through the third resistance R3. In such case, both of electric potentials of the control electrode Ng and the first electrode Ns of the first switch 720 (i.e., two terminals of the third resistance R3) are the electric potential of the power input terminal Nin. Thus, the disconnection of the first switch 720 also makes the power input terminal Nin and the power output terminal Nout electrically disconnected. In contrast, in the normal state, a potential difference between the control terminal Nb and the second terminal Ne of the second switch 730 makes the second switch 730 connected. The first terminal Nc is substantially grounded. There is current passing through the third resistance R3. As such, there is a potential difference between the control electrode Ng and the first electrode Ns of the first switch 720; therefore, the first switch 720 is connected, which makes the power input terminal Nin and the power output terminal Nout connected, such that the power output terminal Nout outputs an output power based upon the input power P.

In some embodiments of the instant disclosure, please refer to FIG. 2. The power conversion unit 70 further comprises a bypass circuit 740 coupled between two terminals of the first switch 720 and the trigger signal unit 80 for transmitting the sensing signal S1 to the trigger signal unit 80.

In some embodiments of the instant disclosure, please refer to FIG. 2. The bypass circuit 740 comprises a fourth resistance R4 coupled between the first switch 720 and the trigger signal unit 80. In the normal state, the fourth resistance R4 weakens the sensing signal S1 entering the trigger signal unit 80 to avoid damage of the trigger signal unit 80.

In some embodiments of the instant disclosure, please refer to FIG. 2. The trigger signal unit 80 comprises an isolation coupling component 810. The isolation coupling component 810 comprises a primary side 820 and a secondary side 830. The primary side 820 is coupled to the bypass circuit 740 and receives the sensing signal S1. The secondary side 830 is coupled to the two doorbell trigger terminals N1, N2.

In some embodiments of the instant disclosure, please refer to FIG. 2. While the electric potential of the power output terminal Nout is grounded, the input power P inputted from the power input terminal Nin is able to be transmitted to the power output terminal Nout (the electric potential is grounded) only through the bypass circuit 740 and the isolation coupling component 810. Thus the sensing signal S1 is enhanced. Since the sensing signal S1 is enhanced and the sensing signal S1 passing through the primary side 820 of the isolation coupling component 810 satisfies a predetermined threshold, the secondary side 830 of the isolation coupling component 810 is connected to have the two doorbell trigger terminals N1, N2 connected. In contrast, in the normal state, since the first switch 720 is connected, which reduces the electric potential between the power input terminal Nin and the power output terminal Nout, the sensing signal S1 is weakened. Since the sensing signal S1 is weakened and the sensing signal S1 passing through the primary side 820 of the isolation coupling component 810 does not satisfy the predetermined threshold, the secondary side 830 of the isolation coupling component 810 is disconnected to have the two doorbell trigger terminals N1, N2 disconnected.

In some embodiments of the instant disclosure, the first switch 720 is a P-type transistor.

In some embodiments of the instant disclosure, the first switch 720 comprises a P-type transistor and a diode. The diode crosses over the first electrode Ns and the second electrode Nd of the P-type transistor to avoid damage of the P-type transistor.

In some embodiments of the instant disclosure, the first switch 720 comprises a P-type transistor and a diode. The diode crosses over the first electrode Ns and the control electrode Ng to avoid damage of the P-type transistor.

In some embodiments of the instant disclosure, the first switch 720 comprises a P-type transistor and plural diodes. The diodes cross over the first electrode Ns and the control electrode Ng to avoid damage of the P-type transistor.

In some embodiments of the instant disclosure, the second switch 730 is a NPN-type bipolar transistor.

In some embodiments of the instant disclosure, the trigger signal unit 80 is an optical coupler.

In some embodiments of the instant disclosure, the trigger signal unit 80 is a relay.

In some embodiments of the instant disclosure, the doorbell unit 30 comprises a doorbell process circuit and a speaker. The doorbell process circuit is coupled between the two doorbell trigger terminals N1, N2 and the speaker. While the two doorbell trigger terminals N1, N2 are shorted, the doorbell process circuit is driven to output a doorbell sound signal to the speaker. The speaker outputs a doorbell sound based upon the doorbell sound signal. In contrast, while the two doorbell trigger terminals N1, N2 are opened, a doorbell chip is not driven, and there is no doorbell sound being outputted.

Concisely, according to embodiments of the doorbell conversion device of the instant disclosure, the doorbell trigger terminals N1, N2 being shorted or opened can be controlled by the electric potential of the power output terminal Nout. Further, the triggering signal of the doorbell switch of the smart doorbell 40 can be converted into a triggering signal of a doorbell sound of an electric doorbell, and an input power P of the electric doorbell can be converted into an operating power of the smart doorbell 40 in the normal state. In addition, according to embodiments of the doorbell assembly 10 of the instant disclosure, the doorbell conversion device 20 and the doorbell unit 30 can be integrated. Further, the triggering signal of the doorbell switch of the smart doorbell 40 can be converted into the doorbell sound of the doorbell assembly 10, and an input power P of the doorbell assembly 10 can be converted into the operating power of the smart doorbell 40 in the normal state. As a result, the electric doorbell and the smart doorbell 40 can be effectively linked without the need of additional power and can provide additional effect.

What is claimed is:

1. A doorbell conversion device, comprising:
 a power input terminal for receiving an input power;
 a power output terminal;
 two doorbell trigger terminals;
 a power conversion unit coupled between the power input terminal and the power output terminal for generating a sensing signal in response to an electric potential of the power output terminal, wherein while the electric potential of the power output terminal is grounded, the power input terminal and the power output terminal are disconnected; wherein while the electric potential of the power output terminal is not grounded, the power input terminal and the power output terminal are connected to have the power output terminal output an output power based upon the input power; and
 a trigger signal unit coupled between the power conversion unit and the two doorbell trigger terminals for controlling the two doorbell trigger terminals to be opened or shorted based upon the sensing signal, wherein while the electric potential of the power output terminal is grounded, the two doorbell trigger terminals are shorted; wherein while the electric potential of the power output terminal is not grounded, the two doorbell trigger terminals are opened.

2. The doorbell conversion device of claim 1, wherein the power conversion unit comprises:
 a voltage dividing circuit coupled to the power output terminal for generating a control signal based upon a dividing of the electric potential of the power output terminal; and
 a first switch coupled between the power input terminal and the power output terminal, the first switch comprising a control electrode, the control electrode being coupled to the voltage dividing circuit for having the first switch connected or disconnected based upon the control signal.

3. The doorbell conversion device of claim 2, further comprising a second switch comprising a first terminal, a second terminal, and a control terminal, wherein the control terminal is coupled to the voltage dividing circuit, the first terminal is coupled to the control electrode of the first switch, and the second terminal is grounded, wherein the first switch is a P-type transistor, and while the electric potential of the power output terminal is not grounded, the second switch is connected to have the control electrode of the first switch grounded and the first switch connected.

4. The doorbell conversion device of claim 2, wherein the power conversion unit further comprises a bypass circuit coupled to two terminals of the first switch for transmitting the sensing signal, the trigger signal unit comprises an isolation coupling component, the isolation coupling component comprises a primary side and a secondary side, the primary side receives the sensing signal, and the secondary side is coupled to the two doorbell trigger terminals.

5. The doorbell conversion device of claim 4, wherein the isolation coupling component is an optical coupler.

6. A doorbell assembly, comprising:
 a power input terminal for receiving an input power;
 a power output terminal;
 two doorbell trigger terminals;
 a power conversion unit coupled between the power input terminal and the power output terminal for generating a sensing signal in response to an electric potential of the power output terminal, wherein while the electric potential of the power output terminal is grounded, the power input terminal and the power output terminal are disconnected; wherein while the electric potential of the power output terminal is not grounded, the power input terminal and the power output terminal are connected to have the power output terminal output an output power based upon the input power;

a trigger signal unit coupled between the power conversion unit and the two doorbell trigger terminals for controlling the two doorbell trigger terminals to be opened or shorted based upon the sensing signal, wherein while the electric potential of the power output terminal is grounded, the two doorbell trigger terminals are shorted; wherein while the electric potential of the power output terminal is not grounded, the two doorbell trigger terminals are opened;

a doorbell unit coupled between the power input terminal and the two doorbell trigger terminals for outputting a doorbell sound while the two doorbell trigger terminals are shorted, and not outputting the doorbell sound while the two doorbell trigger terminals are opened.

7. The doorbell assembly of claim 6, wherein the power conversion unit comprises:

a voltage dividing circuit coupled to the power output terminal for generating a control signal based upon a dividing of the electric potential of the power output terminal; and a first switch coupled between the power input terminal and the power output terminal, the first switch comprising a control electrode, the control electrode being coupled to the voltage dividing circuit for having the first switch connected or disconnected based upon the control signal.

8. The doorbell assembly of claim 7, further comprising a second switch comprising a first terminal, a second terminal, and a control terminal, wherein the control terminal is coupled to the voltage dividing circuit, the first terminal is coupled to the control electrode of the first switch, and the second terminal is grounded, wherein the first switch is a P-type transistor, and while the electric potential of the power output terminal is not grounded, the second switch is connected to have the control electrode of the first switch grounded and the first switch connected.

9. The doorbell assembly of claim 7, wherein the power conversion unit further comprises a bypass circuit coupled to two terminals of the first switch for transmitting the sensing signal, the trigger signal unit comprises an isolation coupling component, the isolation coupling component comprises a primary side and a secondary side, the primary side receives the sensing signal, and the secondary side is coupled to the two doorbell trigger terminals.

10. The doorbell assembly of claim 6, wherein the isolation coupling component is an optical coupler.

* * * * *